United States Patent
Sahu et al.

(10) Patent No.: US 8,231,993 B2
(45) Date of Patent: Jul. 31, 2012

(54) FLEXIBLE MULTI-WALLED TUBING ASSEMBLY

(75) Inventors: Saroj Kumar Sahu, Mountain House, CA (US); Suresh Kumar Natarajan, Fremont, CA (US); Bruce Conway, La Honda, CA (US)

(73) Assignee: Deeya Energy, Inc., Fremont, CA (US)

( * ) Notice: Subject to any disclaimer, the term of this patent is extended or adjusted under 35 U.S.C. 154(b) by 10 days.

(21) Appl. No.: 12/577,124

(22) Filed: Oct. 9, 2009

(65) Prior Publication Data
US 2010/0089480 A1    Apr. 15, 2010

Related U.S. Application Data

(60) Provisional application No. 61/104,588, filed on Oct. 10, 2008.

(51) Int. Cl.
| | |
|---|---|
| H01M 2/38 | (2006.01) |
| H01M 4/36 | (2006.01) |
| H01M 6/24 | (2006.01) |
| H01M 6/48 | (2006.01) |
| H01M 6/20 | (2006.01) |
| H01M 2/36 | (2006.01) |
| H01M 2/40 | (2006.01) |

(52) U.S. Cl. .............. 429/81; 429/70; 429/72; 429/101; 429/105

(58) Field of Classification Search .................... 429/81, 429/70, 72, 101, 105
See application file for complete search history.

(56) References Cited

U.S. PATENT DOCUMENTS

| | | |
|---|---|---|
| 3,540,934 A | 11/1970 | Boeke |
| 3,996,064 A | 12/1976 | Thaller |
| 4,133,941 A | 1/1979 | Sheibley |
| 4,159,366 A | 6/1979 | Thaller |
| 4,309,372 A | 1/1982 | Sheibley |
| 4,312,735 A | 1/1982 | Grimes et al. |
| 4,414,090 A | 11/1983 | D'Agostino et al. |
| 4,454,649 A | 6/1984 | Jalan et al. |
| 4,468,441 A | 8/1984 | D'Agostino et al. |
| 4,485,154 A | 11/1984 | Remick et al. |
| 4,496,637 A | 1/1985 | Shimada et al. |

(Continued)

FOREIGN PATENT DOCUMENTS

DE    102006007206    10/2006

(Continued)

OTHER PUBLICATIONS

PCT International Search Report and the Written Opinion mailed Dec. 2, 2009, in related International Application No. PCT/US2009/060280.

(Continued)

*Primary Examiner* — Patrick Joseph Ryan
*Assistant Examiner* — Julian Anthony
(74) *Attorney, Agent, or Firm* — Haynes and Boone, LLP (57) ABSTRACT

A multi-walled tubing assembly includes an outer corrugated tube and an inner tube received in the outer tube, and may receive an insert. The inner tube is made from a resilient material. The outer tube is structurally rigid. The insert may be plain and used in conjunction with one or more adhesives. The insert may include a section with barbs or teeth which, once inserted into the inner tube, engage with the corrugations of the outer tube. Some embodiments result in a good seal and mechanically fix the tubing assembly.

19 Claims, 8 Drawing Sheets

U.S. PATENT DOCUMENTS

| | | | |
|---|---|---|---|
| 4,543,302 | A | 9/1985 | Gahn et al. |
| 4,732,827 | A | 3/1988 | Kaneko et al. |
| 4,735,444 | A * | 4/1988 | Skipper ............... 285/288.1 |
| 4,784,924 | A | 11/1988 | Savinell et al. |
| 4,814,241 | A | 3/1989 | Nagashima et al. |
| 4,828,666 | A | 5/1989 | Iizuka et al. |
| 4,874,483 | A | 10/1989 | Wakabayashi et al. |
| 4,882,241 | A | 11/1989 | Heinzel |
| 4,894,294 | A | 1/1990 | Ashizawa et al. |
| 4,929,325 | A | 5/1990 | Bowen et al. |
| 4,945,019 | A | 7/1990 | Bowen et al. |
| 4,948,681 | A | 8/1990 | Zagrodnik et al. |
| 4,956,244 | A | 9/1990 | Shimizu et al. |
| 5,061,578 | A | 10/1991 | Kozuma et al. |
| 5,162,168 | A | 11/1992 | Downing et al. |
| 5,188,911 | A | 2/1993 | Downing et al. |
| 5,255,944 | A * | 10/1993 | Blin et al. ............... 285/222.2 |
| 5,258,241 | A | 11/1993 | Ledjeff et al. |
| 5,304,432 | A * | 4/1994 | Townsend ............... 429/50 |
| 5,366,824 | A | 11/1994 | Nozaki et al. |
| 5,648,184 | A | 7/1997 | Inoue et al. |
| 5,656,390 | A | 8/1997 | Kageyama et al. |
| 5,665,212 | A | 9/1997 | Zhong et al. |
| 5,759,711 | A | 6/1998 | Miyabayashi et al. |
| 5,803,132 | A | 9/1998 | Lupke |
| 5,813,438 | A * | 9/1998 | Reed ............... 138/121 |
| 5,851,694 | A | 12/1998 | Miyabayashi et al. |
| 6,005,183 | A | 12/1999 | Akai et al. |
| 6,040,075 | A | 3/2000 | Adcock et al. |
| 6,086,643 | A | 7/2000 | Clark et al. |
| 6,461,772 | B1 | 10/2002 | Miyake et al. |
| 6,475,661 | B1 | 11/2002 | Pellegri et al. |
| 6,494,497 | B1 * | 12/2002 | Kertesz ............... 285/226 |
| 6,509,119 | B1 | 1/2003 | Kobayashi et al. |
| 6,524,452 | B1 | 2/2003 | Clark et al. |
| 6,555,267 | B1 | 4/2003 | Broman et al. |
| 6,562,514 | B1 | 5/2003 | Kazacos et al. |
| 6,692,862 | B1 | 2/2004 | Zocchi |
| 6,759,158 | B2 | 7/2004 | Tomazic |
| 6,761,945 | B1 | 7/2004 | Adachi et al. |
| 6,764,789 | B1 | 7/2004 | Sekiguchi et al. |
| 6,905,797 | B2 | 6/2005 | Broman et al. |
| 6,986,966 | B2 | 1/2006 | Clarke et al. |
| 7,061,205 | B2 | 6/2006 | Shigematsu et al. |
| 7,078,123 | B2 | 7/2006 | Kazacos et al. |
| 7,199,550 | B2 | 4/2007 | Tsutsui et al. |
| 7,220,515 | B2 | 5/2007 | Ito et al. |
| 7,227,275 | B2 | 6/2007 | Hennessy et al. |
| 2003/0008203 | A1 | 1/2003 | Winter |
| 2004/0170893 | A1 | 9/2004 | Nakaishi et al. |
| 2004/2002915 | | 10/2004 | Nakaishi et al. |
| 2004/0241544 | A1 | 12/2004 | Nakaishi et al. |
| 2005/0074653 | A1 | 4/2005 | Broman et al. |
| 2005/0156431 | A1 | 7/2005 | Hennessy |
| 2005/0156432 | A1 | 7/2005 | Hennessy |
| 2005/0158615 | A1 | 7/2005 | Samuel et al. |
| 2005/0164075 | A1 | 7/2005 | Kumamoto et al. |
| 2005/0181273 | A1 | 8/2005 | Deguchi et al. |
| 2005/0260473 | A1 | 11/2005 | Wang |
| 2007/0072067 | A1 | 3/2007 | Symons et al. |
| 2007/0080666 | A1 | 4/2007 | Ritter et al. |
| 2007/0111089 | A1 | 5/2007 | Swan |
| 2008/0193828 | A1 | 8/2008 | Sahu |
| 2009/0218984 | A1 | 9/2009 | Parakulam |
| 2010/0003586 | A1 | 1/2010 | Sahu |
| 2010/0090651 | A1 | 4/2010 | Sahu |
| 2010/0092757 | A1 | 4/2010 | Nair |
| 2010/0092807 | A1 | 4/2010 | Sahu |
| 2010/0092813 | A1 | 4/2010 | Sahu |
| 2010/0092843 | A1 | 4/2010 | Conway |
| 2010/0094468 | A1 | 4/2010 | Sahu |
| 2010/0136455 | A1 | 6/2010 | Winter |
| 2010/0143781 | A1 | 6/2010 | Keshavarz |

FOREIGN PATENT DOCUMENTS

| | | |
|---|---|---|
| JP | 60047373 | 3/1985 |
| JP | 60070672 | 4/1985 |
| JP | 60115174 | 6/1985 |
| JP | 1060967 | 3/1989 |
| JP | 1320776 | 12/1989 |
| JP | 2027667 | 1/1990 |
| JP | 2027668 | 1/1990 |
| JP | 3017963 | 1/1991 |
| JP | 8007913 | 1/1996 |
| JP | 10012260 | 1/1998 |
| JP | 10208766 | 8/1998 |
| JP | 11329474 | 11/1999 |
| JP | 2000058099 | 2/2000 |
| JP | 2000200619 | 7/2000 |
| JP | 2002015762 | 1/2002 |
| JP | 2002175822 | 6/2002 |
| JP | 2002289233 | 10/2002 |
| JP | 2002367661 | 12/2002 |
| JP | 2003173812 | 6/2003 |
| JP | 2005142056 | 6/2005 |
| JP | 2005228622 | 8/2005 |
| JP | 2005228633 | 8/2005 |
| JP | 2005322447 | 11/2005 |
| JP | 2006114360 | 4/2006 |
| JP | 2006147306 | 6/2006 |
| JP | 2006147376 | 6/2006 |
| JP | 2006313691 | 11/2006 |
| JP | 2006351346 | 12/2006 |
| JP | 2007087829 | 4/2007 |
| WO | 8905528 | 6/1989 |
| WO | WO9003666 | 4/1990 |
| WO | 03005476 | 1/2003 |
| WO | 2004079849 | 9/2004 |
| WO | 2006135958 | 12/2006 |

OTHER PUBLICATIONS

Search Report for PCT Application No. PCT/US2009/049285.
Office Action for U.S. Appl. No. 12/217,059 mailed Aug. 23, 2010.
Office Action for U.S. Appl. No. 12/577,137 mailed Sep. 7, 2010.

* cited by examiner

FLEXIBLE MULTI-WALLED TUBING ASSEMBLY

CROSS-REFERENCE TO RELATED APPLICATIONS

The present application claims benefit under 35 U.S.C. §119(e) of U.S. Provisional Application No. 61/104,588 filed on Oct. 10, 2008, entitled "Dual-Walled Tubing Assembly with Barbed Fitting," the content of which is hereby incorporated by reference in its entirety.

BACKGROUND

1. Technical Field

The present disclosure relates generally to a flexible, multi-walled tubing assembly and fittings suitable for vapor impermeable, corrosive liquid applications, and more particularly, to such an assembly with plain and barbed fittings.

2. Discussion of Related Art

Tubing assemblies that provide fluid communication from one tube to another are used in many applications, such as plumbing for hydraulics, oil, or gas, for example. It is also desirable to have a tubing assembly that is flexible in order to be adapted to various applications. Furthermore, it is desirable for the tubing assembly to provide structural rigidity, because a pliable tubing assembly can develop kinks which obstruct flow through the tubing assembly. Additionally, it is desirable for the tubing assembly to maintain a good seal.

It is also desirable to have a tubing assembly that can be easily assembled and connected to other tubes, fittings, or assemblies. Conventional tubing assemblies often require crimping or tooling or other secondary operations to assemble. Further, it is also difficult to find tubing assemblies that maintain a seal while being easy to assemble and apply to a particular application.

Flow cell batteries, for example, include various tubings for the transport of electrolytic fluids (e.g., a catholyte and an anolyte) into and out of the various cells of the batteries. For example, both a catholyte and an anolyte liquid are flowed through each individual cell from holding tanks. In some embodiments, the electrolytes are solutions of Fe and Cr compounds with Cl in hydrochloric acid, and gasses may form as a result of parasitic reactions. Therefore, the tubing assemblies in such systems should be corrosion resistant not only to liquids (e.g., hydrochloric acid), but also be impermeable to gasses (e.g., hydrogen, helium, and hydrochloric acid vapor).

Therefore, there is a need for better tubing assemblies for various applications.

SUMMARY

Consistent with embodiments of the present invention, a flexible, multi-walled tubing assembly is disclosed that includes at least an outer tube having corrugations of a first pitch and an inner tube made from a resilient material and received in the outer tube. The flexible, multi-walled tubing assembly can receive an insert including a first section, the first section being inserted into the inner tube.

A flexible, multi-walled tubing assembly can include a flexible, multi-walled tubing body extending between a first end and a second end, wherein the tubing body includes an inner tube made from a resilient material and an outer tube with corrugations of a first pitch. The flexible, multi-walled tubing assembly receives a first insert and a second insert. The first insert includes a first section and a second section adapted to connect to another tube, the first section of the first insert being inserted into the first end of the tubing body. The second insert includes a first section and a second section adapted to connect to another tube, the first section of the second insert being inserted into the second end of the tubing body.

A method of constructing a flexible, multi-walled tubing assembly consistent with the present invention includes inserting an inner tube formed from a resilient material into an outer tube that has structural rigidity and corrugations with a first pitch; and inserting a first section of an insert into the inner tube.

An insert consistent with the present invention can include a first section that includes annular teeth and a fluid passage, the annular teeth disposed with a pitch that matches that of corrugations on a corresponding outer tube such that if the first section is inserted into a resilient inner tube that is in the outer tube, the teeth force the inner tube into the corrugations creating a seal and mechanically fixing the first section into the outer tube; a second section connected to the first section that couples the fluid passage into a fluid system.

These and other embodiments are further described below with respect to the following figures.

BRIEF DESCRIPTION OF THE DRAWINGS

In order to more fully understand the present invention, reference is made to the accompanying drawings, with the understanding that these drawings are not intended to limit the scope of the invention.

In the figures, elements having the same designation have the same or similar function. The figures are illustrative only and relative sizes and distances depicted in the figures are for convenience of illustration only and have no further meaning.

DETAILED DESCRIPTION

In the following description, for the purposes of explanation, specific details are set forth in order to provide a thorough understanding of the embodiments of the invention. However, it will be apparent that the invention may be practiced without these specific details.

Consistent with various embodiments of the present invention, a flexible, multi-walled tubing assembly is presented.

In some embodiments of the present invention, the flexible, multi-walled tubing assembly may include at least an outer corrugated tube and an inner tube received in the outer tube. The inner tube may be made from a resilient material. An insert may be received by the flexible, multi-walled tubing assembly. The insert may be plain (i.e., without barbs or protrusions) and used along with chemically compatible adhesives to hold the insert, inner tube, and outer tube together and form a seal. The insert may also include teeth or barbs that cooperate with corrugations on the outer tube in order to both seal the inner tube against the outer tube and interlock the insert, inner tube, and outer tube together. The first section of the insert may include an outer surface having annular teeth thereon and may be inserted into the inner tube such that the annular teeth or barbs align with the corrugations in the outer tube. The inner tube is deformed between the annular teeth or barbs and the corrugation.

According to some embodiments, the flexible, multi-walled tubing assembly may include a flexible, multi-walled tubing body extending between a first end and a second end. The tubing body may include an inner tube made from a resilient material and an outer tube with corrugations. The inner tube may receive a first and a second insert. The second insert may include a first section being plain and a second section adapted to connecting to another tube. The second insert may also include a first section having annular teeth thereon and a second section adapted to connecting to another tube. The first section of the second insert is inserted into the second end of the tubing body.

According to some other embodiments, the present disclosure is directed to a method of constructing a flexible, multi-walled tubing assembly. The method may include providing a corrugated outer tube, providing an inner tube made from a resilient material, inserting the inner tube into the outer tube, providing an insert including a first section, which may be plain or include annular teeth thereon, and a second section, and inserting the first section of the insert into the inner tube.

Figure 1:
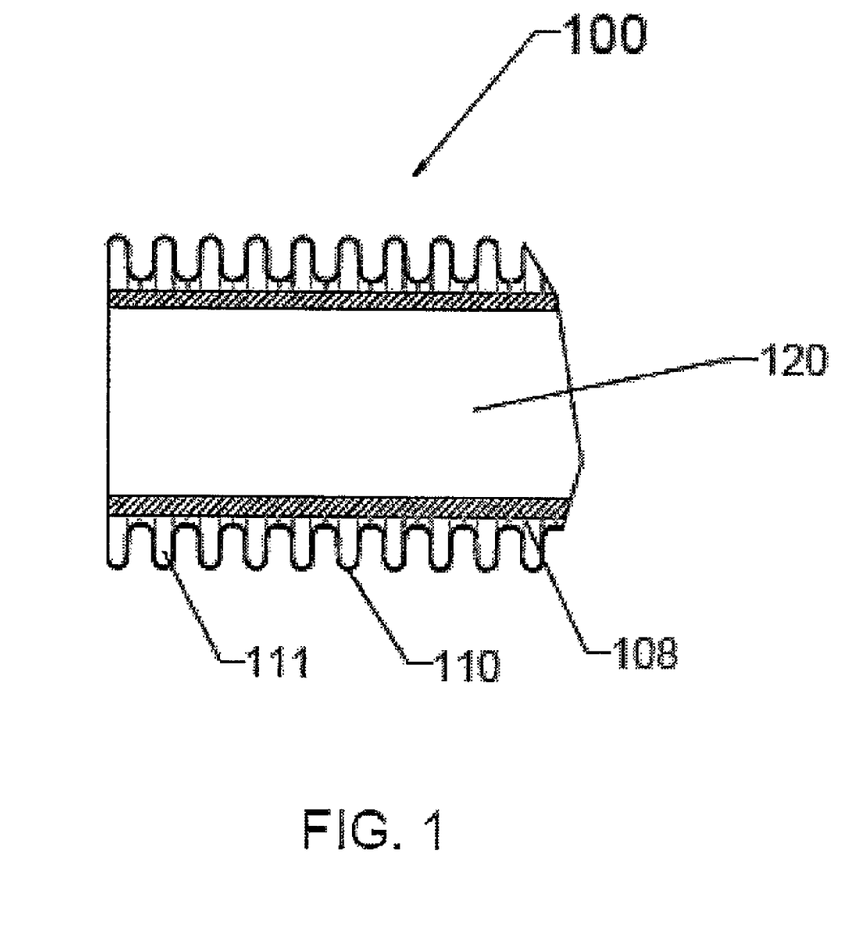
FIG. 1 illustrates a cross-sectional view of an exemplary disclosed flexible, multi-walled tubing assembly according to some embodiments of the invention.

FIG. 1 illustrates a cross-sectional view of a flexible, multi-walled tubing assembly 100 that is consistent with embodiments of the present invention. As shown in FIG. 1, the multi-walled tubing assembly 100 may include an inner tube 108 and an outer tube 110.

Inner tube 108, which includes a passageway 120 through which fluid materials can flow, may be made from a resilient material that provides a good fluid seal and also provides high corrosion resistance to the liquid and/or gas being transported through passageway 120 in tubing assembly 100. Such liquids and gasses can, for example, include acids, alkalis, alcohols, electrolytes (e.g., an acid based electrolyte), and/or many other corrosive materials. Although any elastic tubing with corrosion resistance characteristics can be utilized, in some embodiments inner tube 108 can be made from a thermoplastic elastomer including elastomeric alloys (e.g., SAN-TOPRENE™), synthetic rubber (e.g., Buna rubber and Ethylene Propylene Diene Monomer (EPDM) rubber), and the like.

Outer tube 110 may be made from a relatively rigid material (e.g., a metal, metalized plastic, polyvinyl chloride (PVC), or laminated metal). In some exemplary embodiments, outer tube 110 may have corrugations 111. Corrugations 111 may have any shape (e.g., circular, rectangular, pentagonal, hexagonal, etc. shape). In some embodiments, outer tube 110 is pliant enough to be shaped by hand, or in some cases bent with the assistance of tooling. In some embodiments, outer tube 110 may be shaped during formation for a particular application. The relatively rigid material of outer tube 110 may also have a low permeability to gasses (e.g., hydrogen, helium, and acid vapors). In some embodiments, outer tube 110 can be formed from stainless steel (e.g., grade 316 stainless steel). In some exemplary embodiments, to enhance the corrosion resistance of outer tube 110, before use, outer tube 110 may be washed, etched, and coated with a passivating coating (e.g., PVC, powder coat, and the like).

Multi-walled tubing assembly 100 may be constructed to any suitable size according to the applications in which the multi-walled tubing assembly 100 is intended to be used. The inner tube 108 may, for example, have one inch outside diameter and ⅛ inch wall thickness. The outer tube 110 may, for example, have an inner diameter of one inch and have a pitch of 5 mm. The multi-walled tubing assembly 100 may be constructed to any suitable length. However, any relationship that allows for formation of a seal and self-retaining bonding of assembly 100 can be utilized. During assembly, inner tube 108 is slid into outer tube 110. Lubricants may be used to facilitate sliding inner tube 108 into outer tube 110, particularly for constructing longer tubing assemblies.

Figure 2:
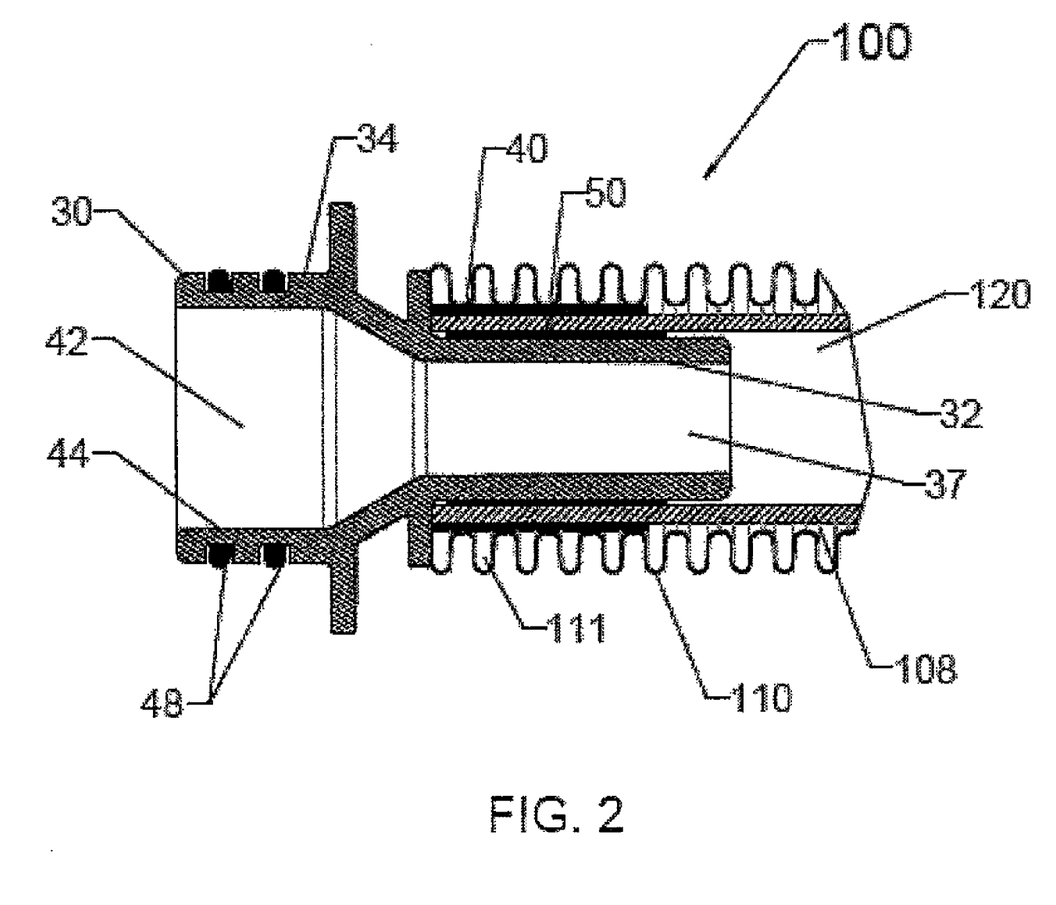
FIG. 2 illustrates a cross-sectional view of an exemplary disclosed flexible, multi-walled tubing assembly according to some embodiments of the invention.

FIG. 2 illustrates a cross-sectional view of a multi-walled tubing assembly 100 that is consistent with embodiments of the present invention. As shown in FIG. 2, the multi-walled tubing assembly 100 may include an outer tube 110 and an inner tube 108, and receive a plain insert 30 inserted in one end of the inner tube 108. In some exemplary embodiments, a tubing assembly consistent with embodiments of the present invention may receive two plain inserts 30 connected to two ends of tubing assembly 100 (as shown in FIG. 3).

Figure 3:
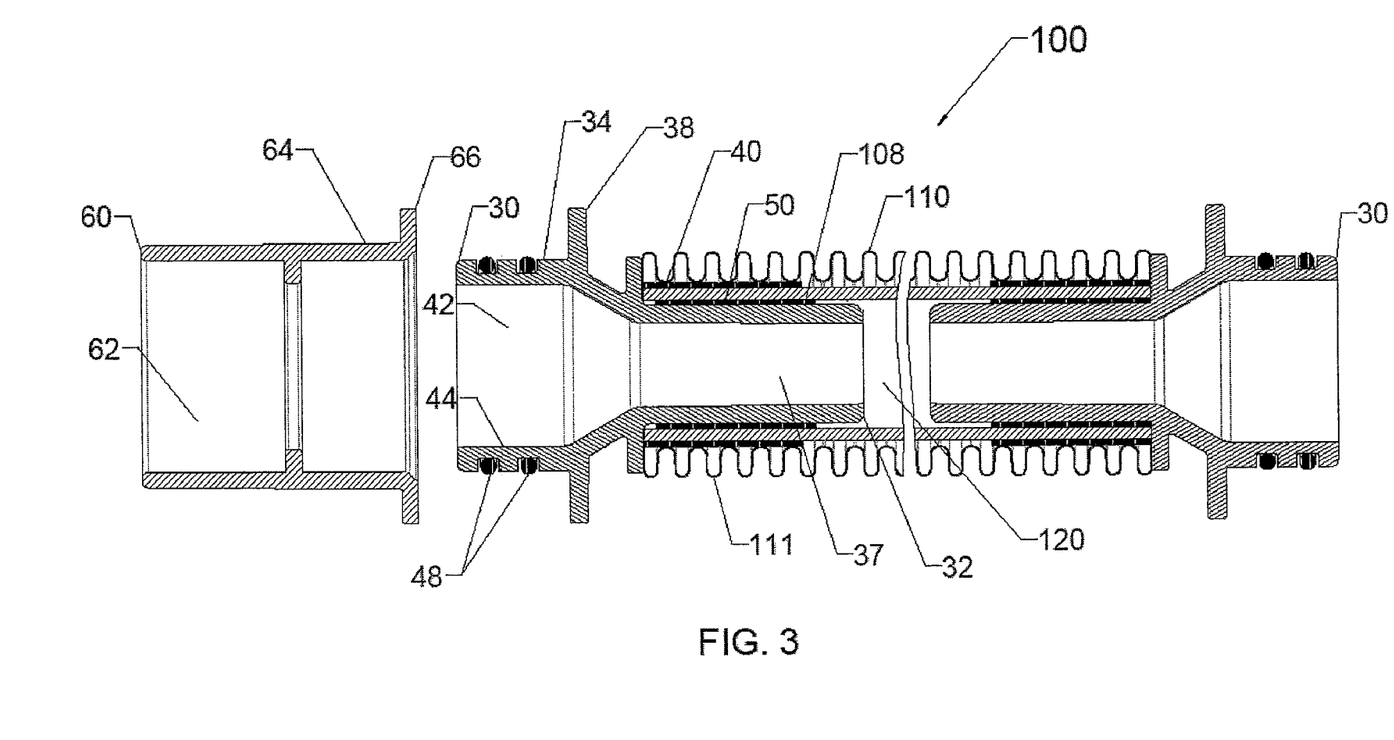
FIG. 3 illustrates a view of an exemplary disclosed multi-walled tubing assembly according to some embodiments of the invention.

As shown in FIGS. 2 and 3, in some exemplary embodiments, outer tube 110 has corrugations 111. Corrugations 111 may have any shape (e.g., circular, rectangular, pentagonal, hexagonal, etc. shape) and are arranged to have a particular pitch (i.e., number of corrugations per unit length). Outer tube 110 may be made from a relatively rigid material (e.g., metal, metalized plastic, polyvinyl chloride (PVC), or laminated metal). In some embodiments, outer tube 110 is sufficiently pliant to be shaped by hand, or in some cases bent with the assistance of tooling. In some embodiments, outer tube 110 may be shaped during formation for a particular application. The relatively rigid material of outer tube 110 may also have a low permeability to gasses (e.g., hydrogen, helium, and acid vapors). In some embodiments, outer tube 110 can be formed from stainless steel (e.g., grade 316 stainless steel). In some exemplary embodiments, to enhance the corrosion resistance of the outer tube 110, outer tube 110 may be washed, etched, and coated with a passivating coating (e.g., PVC, powdered coat, and the like) before use.

As shown in FIGS. 2 and 3, plain insert 30 may be formed from any rigid material with proper strength and chemical resistance, for example, PVC, polyethylene (polythene), polypropylene, any other rigid polymer, and any metal. Plain insert 30 has a first section 32 and a second section 34.

As show in FIGS. 2 and 3, a chemically compatible adhesive 50 (e.g., epoxy, polyurethane, and polyolefin (polyalkene)) is applied such that the adhesive 50 is between the first section 32 of the plain insert 30 and inner tube 108 to hold the insert 30 and inner tube 108 together and form a seal in the finished tubing assembly 100. A chemically compatible adhesive 40 (e.g., epoxy, polyurethane, and polyolefin (polyalkene)) is applied such that the adhesive 40 is between the inner tube 108 and outer tube 110 to hold the inner tube and outer tube together and form a seal in the finished tubing assembly 100. As discussed above, the inner diameter of outer tube 110 and the outer diameter of inner tube 108 are arranged to be substantially the same so that inner tube 108 snugly slides into outer tube 110.

First section of plain insert 30 may include an outer surface which has an outer diameter equal to or substantially close to the inner diameter of the inner tube 108. The length of the first section 32 is arranged to provide a stable connection and a proper seal between the insert 30 and the inner wall of inner tube 108. Second section 34 of plain insert 30 is used for connecting with other tubes, for example, other standard plumbing tubes. As such, second section 34 may be of any configuration appropriate for connection to other tubes, tanks, cells, or any other system in a sealing manner. For example, second section 34 may include sealing rings 48 (e.g., o-rings) at least partially received in recesses defined on an outer surface of second section 34. Sealing rings 48 further provide a seal between second section 34 and a receiving portion or receptacle 60, which may have a portion 64 fitting over the outer surface of the second section 34 (as shown in FIG. 3). In other embodiments, second section 34 may have an inner surface 44 having screw threads thereon for connecting multi-walled tubing assembly 100 with a second tube (not shown).

First section 32 and second section 34 of plain insert 30 may be integrally formed (i.e., formed as a single piece in a single process). First section 32 may have a passageway 37 fluidly connected with passageway 120 of inner tube 108. Fluids include matter in a liquid state, in a gaseous state, or in both a liquid and gaseous state. Second section 34 of plain insert 30 may have a passageway 42 fluidly connected to passageway 37 of first section 32 and passageway 62 of receiving portion or receptacle 60 (as shown in FIG. 3). In some embodiments, second section 34 of plain insert 30 may have a passageway 42 fluidly connected to passageway 37 of first section 32 and the second tube (not shown).

Figure 4:
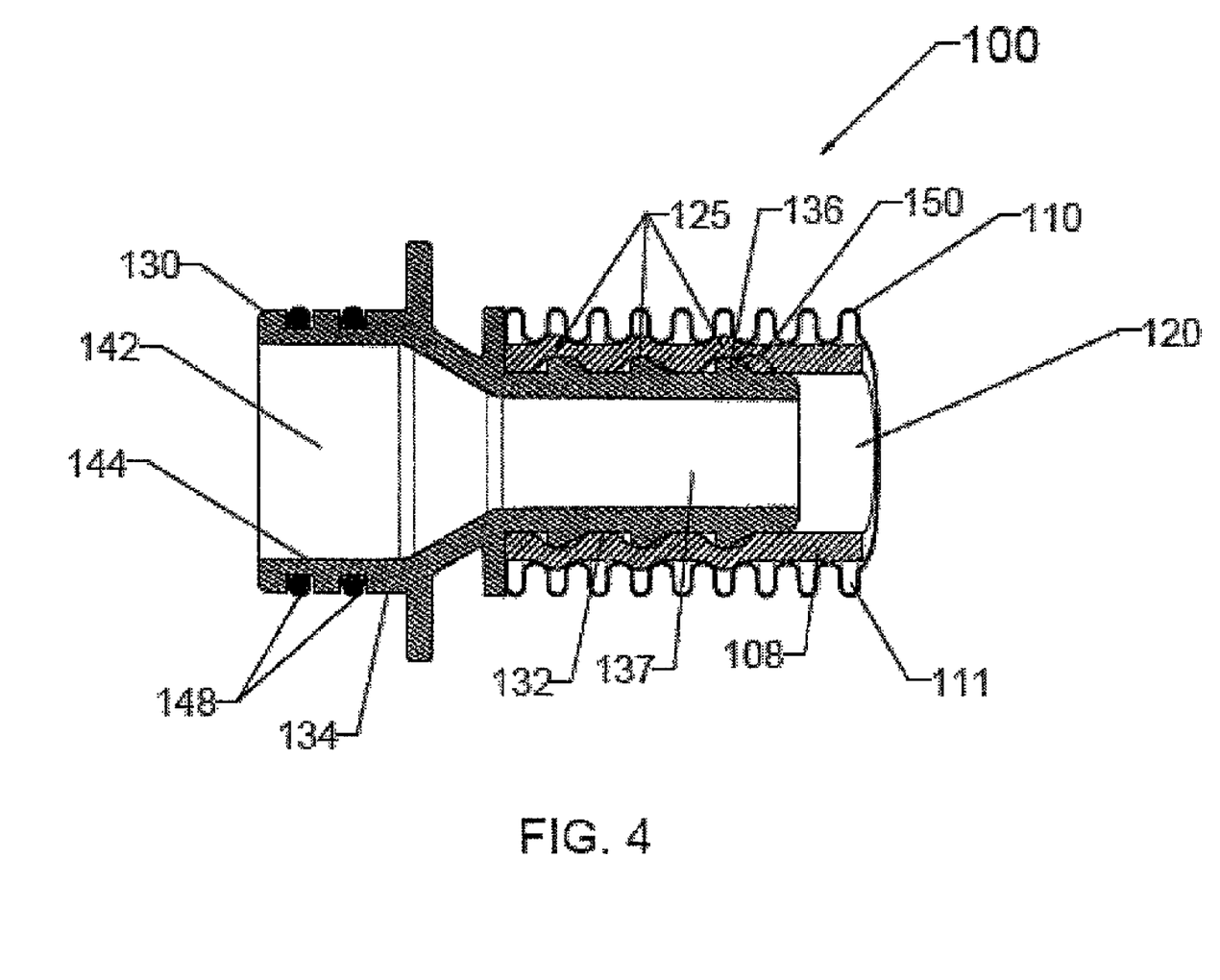
FIG. 4 illustrates a view of an exemplary disclosed multi-walled tubing assembly according to some embodiments of the invention.
Figure 5:
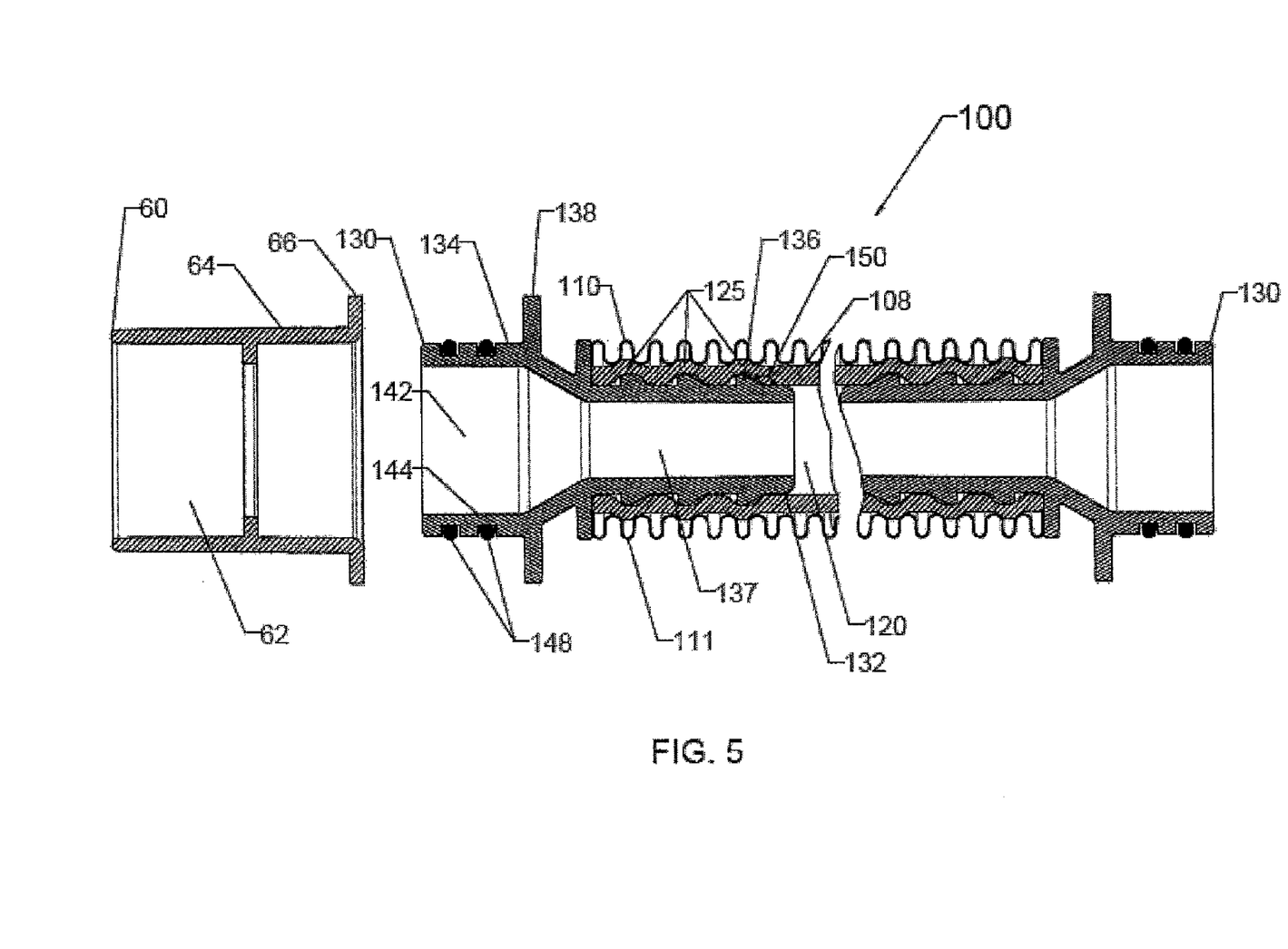
FIG. 5 illustrates a view of an exemplary disclosed multi-walled tubing assembly according to some embodiments of the invention.

FIGS. 4 and 5 illustrate a cross-sectional view of a flexible, multi-walled tubing assembly 100 that is consistent with embodiments of the present invention. As shown in FIGS. 4 and 5, the flexible, dual-walled tubing assembly 100 may include an inner tube 108 and an outer tube 110 that includes corrugations 111, and receive a barbed insert 130 inserted in one end of the inner tube 108. In some exemplary embodiments, a tubing assembly consistent with some embodiments of the present invention may receive two barbed inserts 130 connected to two ends of tubing assembly 100 (as shown in FIG. 5).

As shown in FIGS. 4 and 5, inner tube 108, which includes a passageway 120 through which fluid materials can flow, may be made from a resilient material that provides a good fluid seal and also provides high corrosion resistance to the liquid and/or gas being transported through passageway 120 in tubing assembly 100. Such liquids and gasses can, for example, include acids, alkalis, alcohols, electrolytes (such as an acid based electrolyte), and/or many other corrosive materials. Although any elastic tubing with corrosion resistance characteristics can be utilized, in some embodiments inner tube 108 can be made from a thermoplastic elastomer including elastomeric alloys (e.g., SANTOPRENE™), synthetic rubber (e.g., Buna rubber and ethylene propylene diene monomer (EPDM) rubber), and the like.

As shown in FIGS. 4 and 5, in some exemplary embodiments, outer tube 110 has corrugations 111. Corrugations 111 may have any shape (e.g., circular, rectangular, pentagonal, hexagonal, etc. shape) and are arranged to have a particular pitch (i.e., number of corrugations per unit length). Outer tube 110 may be made from a relatively rigid material (e.g., metal, metalized plastic, polyvinyl chloride (PVC), or laminated metal). In some embodiments, outer tube 110 is sufficiently pliant to be shaped by hand, or in some cases bent with the assistance of tooling. In some embodiments, outer tube 110 may be shaped during formation for a particular application. The relatively rigid material of outer tube 110 may also have a low permeability to gasses (e.g., hydrogen, helium, and acid vapors). In some embodiments, outer tube 110 can be formed from stainless steel (e.g., grade 316 stainless steel). In some exemplary embodiments, to enhance the corrosion resistance of the outer tube 110, outer tube 110 may be washed, etched, and coated with a passivating coating (e.g., PVC, powdered coat, and the like) before use.

Flexible, multi-walled tubing assembly 100 may be constructed to any suitable size according to the applications in which the flexible, multi-walled tubing assembly 100 is intended to be used. The inner tube 108 may, for example, have a one inch outside diameter and ⅛ inch wall thickness. The outer tube 110 may, for example, have an inner diameter of one inch and have a pitch of 5 mm. The flexible, multi-walled tubing assembly 100 may be constructed to any suitable length. However, any relationship that allows for formation of a seal and self-retaining mechanical bonding of assembly 100 can be utilized.

During assembly, inner tube 108 is slid into outer tube 110. Lubricants may be used to facilitate sliding inner tube 108 into outer tube 110, particularly for constructing longer tubing assemblies. As discussed above, the inner diameter of outer tube 110 and the outer diameter of inner tube 108 are arranged to be substantially the same so that inner tube 108 snugly slides into outer tube 110.

Barbed insert 130, as shown in FIG. 4, may include a first section 132 and a second section 134. First section 132 of barbed insert 130 may include an outer surface that has an outer diameter equal to or substantially close to the inner diameter of the inner tube 108. Further, first section 132 also includes annular teeth or barbs 136 extending from the outer surface of first section 132. In some embodiments, teeth or barbs 136 project in an opposite direction from second section 134 to first section 132 to prevent the insert 130 from moving backward and out of inner tube 108 once it has been inserted. In addition, the pitch of teeth or barbs 136 is related to the pitch of corrugations 111 so that, once inserted, teeth or barbs 136 fall within individual corrugations 111. Further, inner tube 108 is deformed 125 by teeth or barbs 136 into individual ones of corrugations 111, enhancing the seal of tubing assembly 100. Further, with teeth or barbs 136 interlocking with corrugations 111, barbed insert 130 is mechanically fixed inside inner tube 108 once inserted. Insert 130 can be formed from any rigid material, (e.g., PVC, polyethylene (polythene), polypropylene, any other rigid polymer, or any metal).

As an example as shown in FIGS. 4 and 5, teeth or barbs 136 each have one edge projecting substantially radially outward and another edge projecting substantially radially inward at an angle 150. In some embodiments, angle 150 can be 150°. The height of the barbs is arranged to provide a proper compression against the inner wall of inner tube 110, resulting a good seal for liquid and gas. The length of the first section 132 can also be arranged to provide a stable connection and a proper seal between the barbed insert 130 and the inner wall of inner tube 108. For example, although first section 132 may include any number of teeth or barbs 136, first section 132 may have a length that can accommodate three barbs as shown in FIG. 1. The spacing between adjacent two barbs can be arranged to match the distance between two corrugations or multiple times of the distance between two corrugations of the outer tube 110. As shown in FIGS. 4 and 5, teeth or barbs 136 cause some areas of inner tube 108 to deform or rise. In some embodiments, the inner tube deforms or rises when the inner tube conforms in shape to the corrugations of the outer tube. The rising areas are partially received in corrugations 111 of outer tube 110. Because outer tube 110 is made from a relatively rigid material, outer tube 110 will not deform of will deform less than inner tube 108. Outer tube 110 will press inner tube 108 inwardly against teeth or barbs 136, thereby creating dual compression zones 125.

Second section 134 of barbed insert 130 is used for connecting with other tubes, for example, other standard plumbing tubes. As such, second section 134 may be of any configuration appropriate to other tubes, tanks, cells, or any other system in a sealing manner. For example, second section 134 may include sealing rings 148 (e.g., o-rings) at least partially received in recesses defined on an outer surface of second section 134. Sealing rings 148 further provide a seal between second section 134 and a receiving portion or receptacle 60 which may have a third section 64 fitting over the outer surface of the second section 134 (as shown in FIG. 5). In some embodiments, second section 134 may have an inner surface 144 having screw threads thereon for connecting multi-walled tubing assembly 100 with a second tube (not shown).

Barbed insert 130 may be formed from any materials with proper strength and chemical resistance (e.g., PVC, polyethylene (polythene), polypropylene, any other rigid polymer, and any metal). As shown in FIGS. 4 and 5, first section 132 and second section 134 of barbed insert 130 may be integrally formed (i.e., formed as a single piece in a single process). First section 132 may have a passageway 137 fluidly connected with passageway 120 of the inner tube 108. Fluids include matter in a liquid state, in a gaseous state, or in both a liquid and gaseous state. Second section 134 of plain insert 130 may have a passageway 142 fluidly connected to passageway 137 of first section 132 and passageway 62 of receiving portion or receptacle 60 (as shown in FIG. 5). Second section 134 of barbed insert 130 may have a passageway 142 fluidly connected with passageway 137 and the second tube.

Receiving portion or receptacle 60 may be formed from any materials with proper strength and chemical resistance (e.g., PVC, polyethylene (polythene), polypropylene, any other rigid polymer, and any metal).

Figure 6:
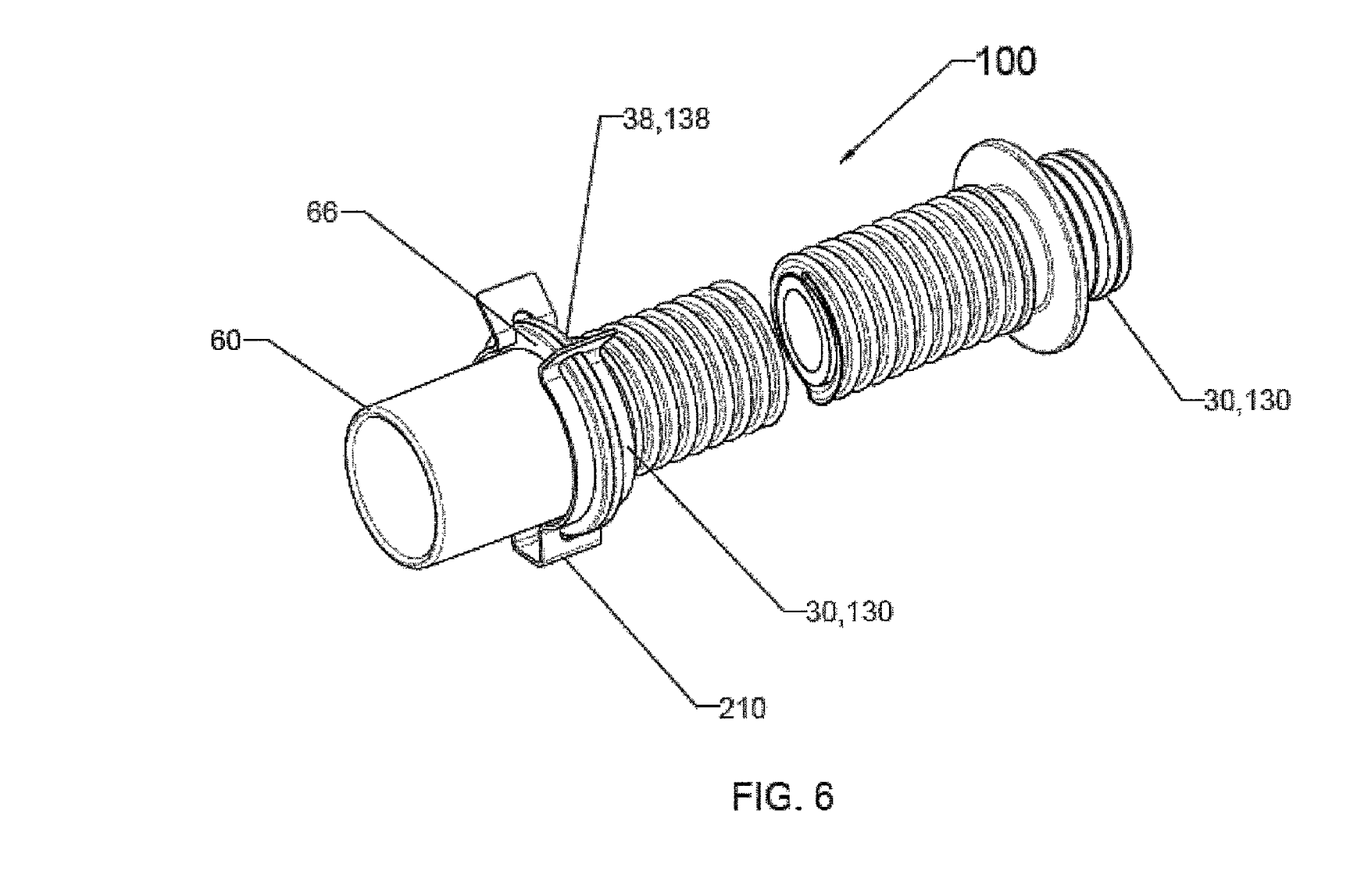
FIG. 6 illustrates a view of an exemplary disclosed multi-walled tubing assembly according to some embodiments of the invention.

Referring to FIGS. 3 and 5, second section 34, 134 of insert 30, 130 may include a first flange 38, 138, respectively. Receiving portion or receptacle 60 may include a second flange 66. When second section 34, 134 is received in the third section 64, the first flange 38, 138 and the second flange 66 are placed in contact with each other (shown in FIG. 6). As shown in FIG. 6, a retaining clip or clamp 210 may contact and hold the first flange 38, 138 and the second flange 66 against each other.

Figure 7:
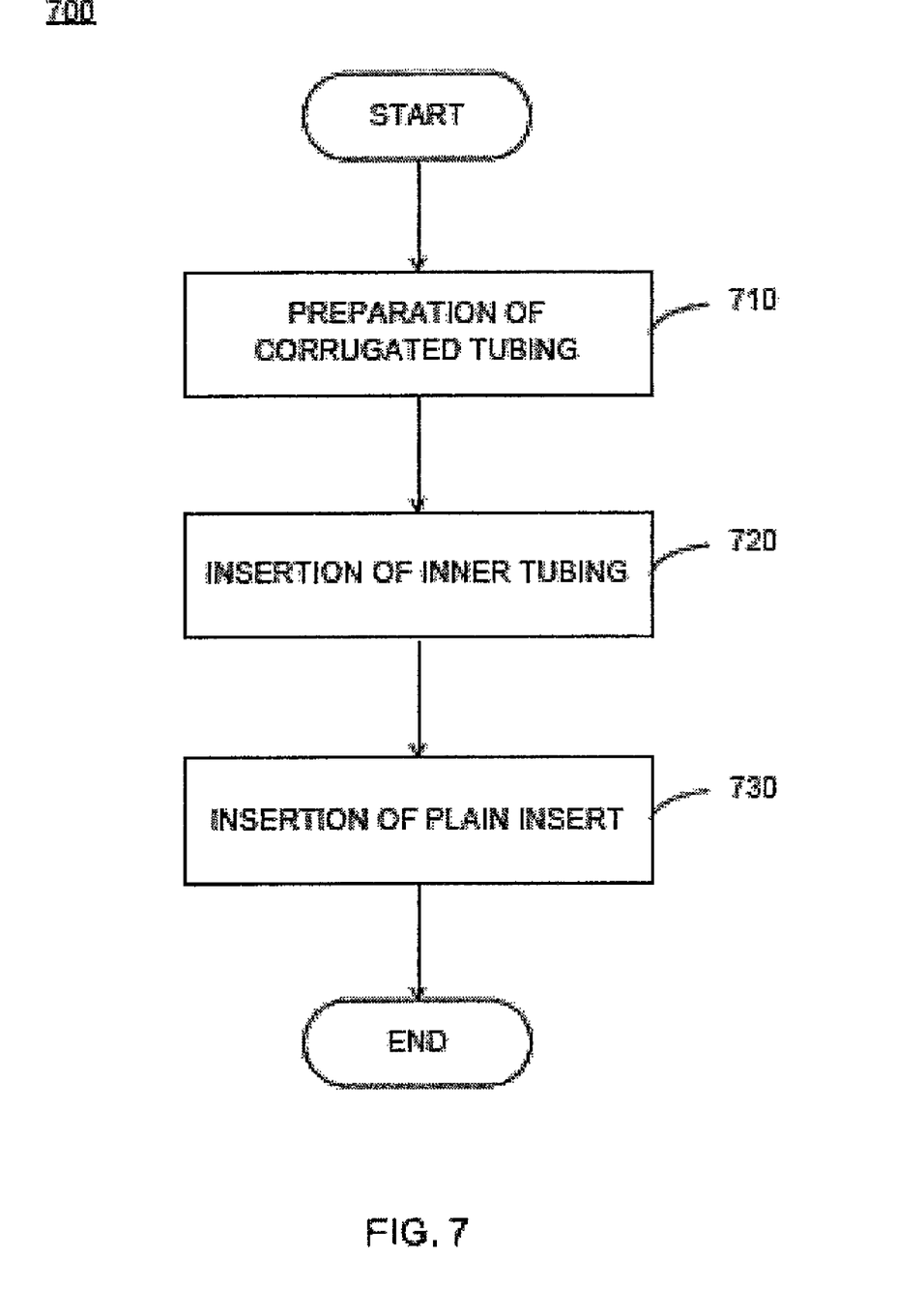
FIG. 7 shows a flow chart illustrating the assembly of a flexible, multi-walled tubing assembly consistent with some embodiments of the present invention.

FIG. 7 illustrates a process 700 for assembling a flexible, multi-walled tubing assembly 100 consistent with some embodiments of the present invention. In step 710, outer tubing 110 may be prepared. In some embodiments, outer tubing 110 may be bent and shaped for a particular application. Preparation may, in some embodiments, further include cleaning outer tubing 110 by dipping in a cleaning solution, which may be an acid bath. In addition to cleaning, outer tubing 110 may be coated with, for example, a PVC coating. A PVC coating may be applied by dipping outer tubing 110 in liquid PVC coating and drying outer tubing 110.

In step 720, inner tube 108 is inserted into outer tubing 110. Inner tube 108 of flexible, multi-walled tubing assembly 100 may first be lubricated with, for example, methanol and inserted into outer tube 110 so that flexible, multi-walled tubing assembly 100 now includes outer tubing 110 that is completely lined with inner tubing 108. Flexible, multi-walled tubing assembly 100 may then be dried so that the lubricant is removed. A chemically compatible adhesive 40 (e.g., epoxy, polyurethane, and polyolefin (polyalkene)) may be applied such that it is between the outer tubing 110 and inner tubing 108.

In step 730, plain insert 30 is inserted into one or both ends of flexible, multi-walled assembly 100. A chemically compatible adhesive 50 (e.g., epoxy, polyurethane, and polyolefin (polyalkene)) may be applied such that it is between the plain insert 30 and the inner tube 108. In some embodiments, first section 32 of plain insert 30 may be hand-thrust into flexible, multi-walled tubing assembly 100, although a tool may also be utilized for this procedure. Inner tube 108 can be slightly longer than outer tube 110, which allows for the deformation and compression of inner tube 108 that occurs during the fitting process. Therefore, after first section 32 is inserted into inner tube 108, both of inner tube 108 and outer tube 110 can be firmly butted against second section 34, which can have a larger diameter than that of first section 32. Once plain insert 30 is inserted into flexible, multi-walled tubing assembly 100, flexible, multi-walled tubing assembly 100 provides a seal to both the liquid being carried in multi-walled assembly 100 and to the gasses that may be included in the liquid. Further, multi-walled tubing assembly 100, once assembled, is fixed and no additional fasteners or other arrangements are required to hold multi-walled tubing assembly 100 together.

Figure 8:
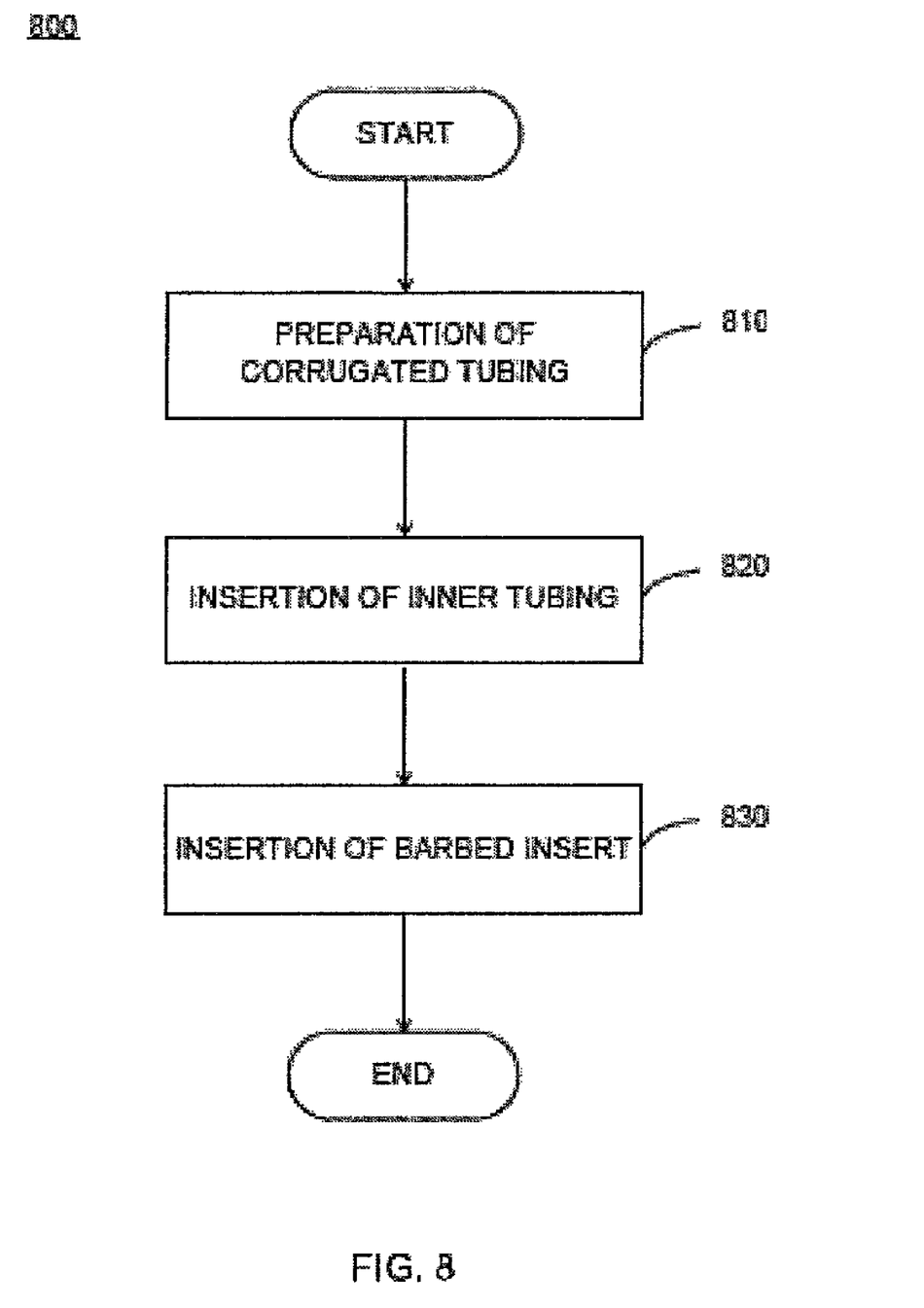
FIG. 8 shows a flow chart illustrating the assembly of a flexible, multi-walled tubing assembly consistent with some embodiments of the present invention.

FIG. 8 illustrates a process 800 for assembling a flexible, multi-walled tubing assembly 100 consistent with some embodiments of the present invention. In step 810, outer tubing 110 may be prepared. In some embodiments, outer tubing 110 may be bent and shaped for a particular application. Preparation may, in some embodiments, further include cleaning outer tubing 110 by dipping in a cleaning solution, which may be an acid bath. In addition to cleaning, outer tubing 110 may be coated with, for example, a PVC coating. A PVC coating may be applied by dipping outer tubing 110 in liquid PVC coating and drying outer tubing 110.

In step 820, inner tube 108 is inserted into outer tubing 110. Inner tube 108 of multi-walled tubing assembly 100 may first be lubricated with, for example, methanol, and inserted into outer tube 110 so that multi-walled tubing assembly 100 now includes outer tubing 110 that is completely lined with inner tubing 108. Multi-walled tubing assembly 100 may then be dried so that the lubricant is removed.

In step 830, barbed insert 130 is inserted into one or both ends of multi-walled assembly 100. In some embodiments, first section 132 of barbed insert 130 may be hand-thrust into multi-walled tubing assembly 100, although a tool may also be utilized for this procedure. Inner tube 108 can be slightly longer than outer tube 110, which allows for the deformation and compression of inner tube 108 that occurs during the fitting process. Therefore, after first section 132 is inserted into inner tube 108, both of inner tube 108 and outer tube 110 can be firmly butted against second section 134, which can have a larger diameter than that of first section 132. Once barbed insert 130 is inserted into multi-walled tubing assembly 100, multi-walled tubing assembly 100 provides a seal to both the liquid being carried in multi-walled assembly 100 and to the gasses that may be included in the liquid. Further, multi-walled tubing assembly 100, once assembled, is mechanically fixed and no additional fasteners or other arrangements are required to hold multi-walled tubing assembly 100 together.

Several advantages over the prior art may be achieved with embodiments of the multi-walled tubing assembly 100. Some embodiments of the flexible multi-walled tubing assembly 100 provide a good seal for liquid or gas and provide fluid communication between two tubes or pipes that are connected to two plain or barbed inserts (as shown in FIGS. 2-5). Some embodiments of multi-walled tubing assembly 100 are flexible and can be formed to a desired angle, thereby providing a flexible routing solution. Some embodiments of flexible, multi-walled tubing assembly and 100 have structural rigidity and are not prone to becoming kinked. Moreover, some embodiments of the flexible, multi-walled tubing assembly 100 may be constructed without any tooling. Inner tube 108 and outer tube 110 with precut lengths may be assembled one inside the other to form a flexible, multi-walled tube, and the flexible, multi-walled tube may be fitted over the first section 132 of the barbed insert 130 by hand. The same process may be repeated for the other end (as shown in FIGS. 3 and 5). As indicated above, once inserted barbed insert 130 is self retaining and does not require a secondary crimp sleeve to retain insert 130.

It will be apparent to those skilled in the art that various modifications and variations can be made to the flexible, multi-walled tubing assembly. Other embodiments will be apparent to those skilled in the art from consideration of the specification and practice of the disclosed flexible, multi-walled tubing assembly. As those of ordinary skill in the art will readily appreciate, for example, an additional tube or tubes may also be included in the flexible, multi-walled tubing assembly. For example, an innermost tube received in the inner tube, a middle tube received in the outer tube and receiving the inner tube, an outermost tube receiving the outer tube, and the like. The additional tubes may contribute to the rigidity, corrosion resistance, gas impermeability, thermal insulative, electrical insulative, operating temperature, operating pressure, etc. properties of the multi-walled tubing assembly. It is intended that the specification and examples be considered as exemplary only, with a true scope being indicated by the following claims and their equivalents.

What is claimed is:

1. A flow cell battery, comprising:
a flow cell;
at least one holding tank, coupled to the flow cell, containing an electrolyte composition that is provided to the flow cell during use; and
a tubing assembly, comprising
an outer tube, the outer tube having corrugations of a first pitch and low permeability to gasses, the corrugations extending along an entire length of the outer tube;
an inner tube received in the outer tube, the inner tube comprised of an elastic material and having corrosion resistance to liquids and gasses; and
a first insert, the first insert including a first section with an outer surface having annular teeth thereon, the annular teeth having a second pitch related to the first pitch such that the distance between two adjacent annular teeth is a non-zero integer multiple of the distance between two adjacent corrugations of the outer tube, wherein:
the first section is received by the inner tube such that the annular teeth engage with the corrugations, the annular teeth cause areas of the inner tube to deform, and the deformed areas are generally received in the corrugations.

2. The flow cell battery of claim 1, wherein the outer tube is comprised of a metal, a metalized plastic, or a laminated material.

3. The flow cell battery of claim 1, wherein the elastic material is a thermoplastic elastomer or a synthetic rubber.

4. The flow cell battery of claim 1, wherein the first insert is made from polyvinyl chloride, a rigid polymer, or a metal.

5. The flow cell battery of claim 1, wherein each of the annular teeth is comprised of at least two edges, a first edge which projects substantially radially outward and a second edge which projects substantially radially inward.

6. The flow cell battery of claim 5, wherein the second edge projects radially inward at a predetermined angle.

7. The flow cell battery of claim 6, wherein the predetermined angle is about 150 degrees.

8. The flow battery of claim 1, wherein the tubing assembly further comprises a first chemically-compatible adhesive, the first chemically-compatible adhesive being compatible with the outer tube and inner tube, and being in-between a section of an inner surface of the outer tube and an outer surface of the inner tube.

9. The flow cell battery of claim 8, wherein the first chemically-compatible adhesive is comprised of at least one of epoxy, polyurethane, and polyolefin (polyalkene).

10. The flow cell battery of claim 8, wherein the tubing assembly further comprises:
a first insert, the first insert including a first section, the first section being inserted into the inner tube; and
a second chemically compatible adhesive, the second chemically compatible adhesive being compatible with the first insert and the inner tube, and being in-between the first section of the first insert and the outer surface of the inner tube.

11. The flow cell battery of claim 10, wherein the first insert is made from polyvinyl chloride, a rigid polymer, or a metal.

12. The flow cell battery of claim 10, wherein the second chemically-compatible adhesive is comprised of at least one of epoxy, polyurethane, and polyolefin (polyalkene)).

13. A flow cell battery, comprising:
a flow cell;
at least one holding tank, coupled to the flow cell, containing an electrolyte composition that is provided to the flow cell during use; and
a tubing assembly, comprising:
a multi-walled tubing body extending between a first end and a second end, wherein the tubing body is comprised of an inner tube being corrosion resistant and comprised of an elastic material, and an outer tube having a low gas permeability and corrugations of a first pitch, the outer tube corrugations extending along an entire length of the outer tube;
a first insert received by the inner tube at the first end; and
a second insert received by the inner tube at the second end, wherein:
the first and second inserts each include a first section with an outer surface having annular teeth thereon;
the annular teeth having a second pitch related to the first pitch such that the distance between two adjacent annular teeth is a non-zero integer multiple of the distance between two adjacent corrugations of the outer tube;
the first section is received by the inner tube at the first end and the second end such that the annular teeth engage with the corrugations, the annular teeth cause areas of the inner tube to deform, and the deformed areas are generally received in the corrugations.

14. The flow cell battery of claim 13, wherein the first and second inserts each include a second section, the second section being adapted to connect to a receptacle or a tube, and including an outer surface with at least one recess thereon, each recess configured to receive a sealing ring.

15. The flow cell battery of claim 13, wherein the first and second inserts each include a second section, the second section being adapted to connect to a receptacle or a tube, and including an inner surface with screw threads thereon.

16. The flow cell battery of claim 13, further comprising:

a first chemically-compatible adhesive in-between a section of an inner surface of the outer tube and an outer surface of the inner tube, wherein the first chemically-compatible adhesive is compatible with the outer tube and inner tube; and a second chemically compatible adhesive in-between a first section of the first and second inserts and the inner surface of the inner tube, wherein the second chemically compatible adhesive is compatible with the first and second inserts and the inner tube.

17. The flow cell battery of claim 13, wherein each of the annular teeth is comprised of at least two edges, a first edge which projects substantially radially outward and a second edge which projects substantially radially inward.

18. The flow cell battery of claim 17, wherein the second edge projects radially inward at a predetermined angle.

19. The flow cell battery of claim 18, wherein the predetermined angle is about 150 degrees.

* * * * *